Jan. 19, 1971
A. J. CUSATO
3,555,677
WIRE CUTTING TOOL
Filed March 1, 1968
2 Sheets-Sheet 1
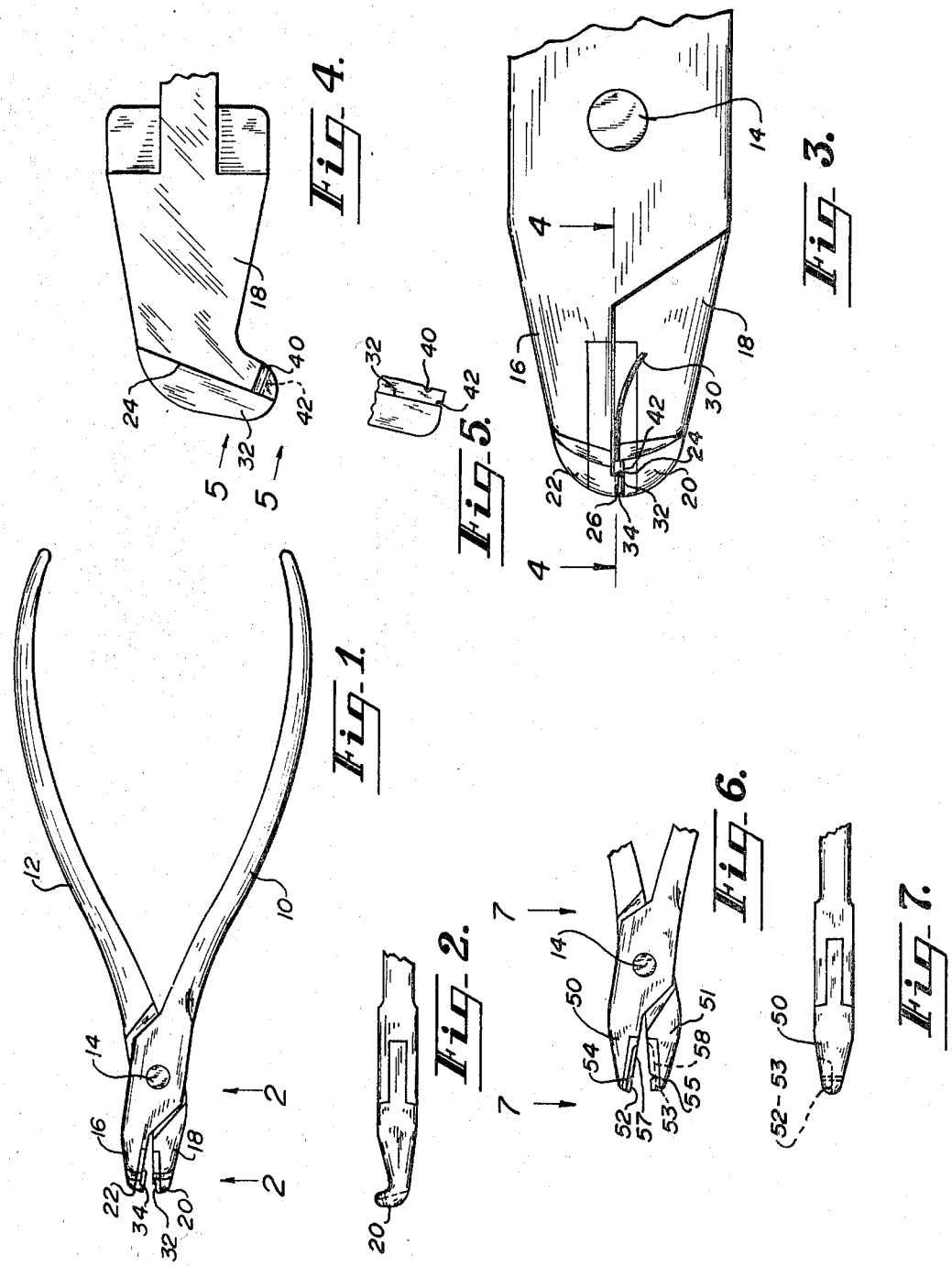
INVENTOR.
ANTHONY J. CUSATO
BY
Ralph R Roberts
AGENT.

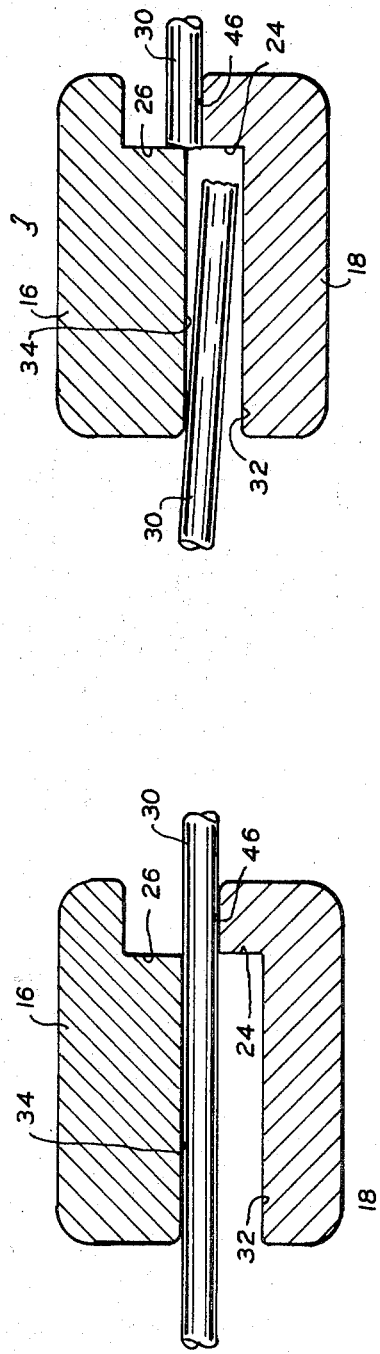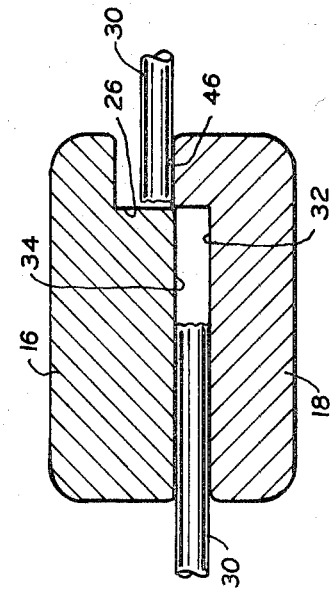

United States Patent Office 3,555,677
Patented Jan. 19, 1971

3,555,677
WIRE CUTTING TOOL
Anthony J. Cusato, 22 Maplewood Road,
Closter, N.J. 07624
Filed Mar. 1, 1968, Ser. No. 709,691
Int. Cl. B26b 13/00
U.S. Cl. 30—134          5 Claims

ABSTRACT OF THE DISCLOSURE

A plier-type wire cutting tool particularly for use in orthodontics, the jaws of the tool disposed for shear cutting of wires. The cutting tool in its jaw members is disposed to mate and to provide opposing and extending shelf portions disposed adjacent the shear portions of the jaws, the spacing apart of the shelf portions is disposed so as to receive the cut extending portion of wire to retain the cut wire in a gripped condition between the shelf portions as the tool is removed from the mouth and/or until the jaws are opened. A notch may be provided in one of the jaws so that the wire may ge gripped by the shelf portions absent a shear cutting action.

BACKGROUND OF THE INVENTION

Field of the invention

The field of art to which this invention pertains is particularly found in the class of Dentistry and more particularly in the subclass of "Instruments" and even further in the subclass thereunder pertaining to "Cutters" and to "Orthodontic Instruments."

Description of the prior art

In the practice of orthodontics, the use of wires to retain, to manipulate and to pull the teeth into a desired alignment is an established procedure. In particular, clips and the like are cemented to teeth and into these clips wires are fed and attached in a desired manner to cause the teeth to be adjusted to a desired position or condition. In the forming and attaching of these wires, a small surplus of wire is customarily provided as a practical matter. After the completion of the installation of the wire in the mouth, the dentist trims or cuts the surplus end of the wire or ends of the wire from the retaining configuration. The wire customarily used in orthodontics is a very high tensile alloy wire so that in the cutting of this wire by nippers, the short surplus or unattached end has a tendency to fly. This flying wire piece may cause injury to the patient unless the orthodontist takes careful steps to catch or trap it. For example, as a catching device, the dentist may use a portion of cotton roll or a finger from his other hand. With either method, the results are not fool-proof and sometimes the cutting of the wire results in the end of the wire flying into his (the orthodontist's) finger or the mouth of the patient.

Prior to this invention it has been usual for diagonal or nipper-type cutters to be used to cut the wire. In these cutters the jaws are sharpened so as to be brought together in edge-to-edge engagement to cut the stainless steel and/or Australian-type wire. These nipper-type cutters do not have their jaws passing each other in the manner of a scissors to produce a shear cut, which is the cut produced by tool of the present invention.

It is to be noted that in the prior art two U.S. patents are representative of the compressive style of wire cutting. U.S. Patent No. 3,209,458 to Rosen is a compressive cutter whose jaws are sharpened in the manner of a nipper-type wire cutter with the cutting edges disposed at the extreme outer end of the jaws. In the tool exemplified in this patent, the cut end of the wire is contemplated to be retained within the confines of the jaws. This wire-receiving portion within the confines of the jaws extends from the tip towards the pivot portion of the tool. Such an arrangement does not permit the wire ends at or near the molars to be easily or exactly cut, if they can be cut at all. In U.S. Patent No. 3,348,405 to Johnson there is shown a transistor lead cutting tool disposed to also use the compressive type of cut. The tools of these patents are not particularly adapted for use in orthodontics but are representative of the general type of tools available for wire cutting and forming.

In the use of wires in orthodontics, it is of particular note that the cutting of the wire should produce no dislodgement of the wire from its disposed installed position as determined by the orthodontist. It is also important that the surplus end of the wire, when cut from the installed wire, should not be lost in the mouth or should not fly into the patient's tissues or the throat or in any other manner be a danger to the patient or a detriment in the practice of the dentist. In the embodiments of the wire cutting tool of this invention with the jaws disposed to provide either as an offset or angled cutter or as a straight cutter, it is contemplated that the wire cutting tool will shear cut at a determined point the wire such as used in the formation of the orthodontic bridge and the trimmed or cut portion of the wire will be gripped and retained by the outer shelf portions of the jaws during and while the tool is in a closed condition and as it is removed from the mouth, after which the trimmed portion of the wire is released and discarded from the opened tool.

SUMMARY OF THE INVENTION

The wire cutting tool of this invention is contemplated to be of stainless steel with hardened steel insert cutting portions provided in the extended portions of the jaws. This tool is of the plier-type having jaws disposed to cut wire which is usually of stainless steel or "Australian" wire, both of which are generally used in the practice of orthodontics. This wire is made with a high tensile strength and stiffness and is extremely difficult to cut. The cutting portions of this tool are disposed so as to cut the wire with a shear action rather than with a compressive cut provided by conventional diagonal or nipper-type cutting pliers. The jaws of this tool include extending shelf portions which are continued outwardly. The facing surfaces of these shelf portions are disposed in a spaced relationship to each other so that the sheared wire end is gripped between the shelf faces to retain the wire in the jaws until the cutting tool is removed from the patient's mouth and the jaws of the tool opened to release the cut wire piece.

It is contemplated that a small notch may be provided in the wire-receiving portions of the cutting shoulders of the jaws. These notches are intended to provide a retaining guide for the wire during the cutting operation so that the wire may be retained in the placed position in the jaws; however, these notches are not essential in the cutting but are merely a matter of convenience in that the wire may be disposed anywhere on the cutting jaws and the wire cut at this location on its jaw surface. Contrary to the wire-cutting nippers in which the jaws are sharpened for cutting the wire with the jaws being brought into contiguous relationship or into face-to-face relationship to cut the wire, the jaws of the tool of this invention are shaped to provide a shear cut. As in the case of all wire cutters, the handle portions are shaped to provide a grasping surface so as to apply a determined force. The pivot pin joining the plier members is the fulcrum around which the jaw members are supported to provide a tremendous amount of mechanical advantage so that the wire may be cut in an expeditious manner.

In the process of installing of the wire in the wire-retaining portions cemented to the teeth, the orthodontist needs grip and push the wire into an installed position. Prior to this invention, often nipper-type cutters are used to grip the wire but with the cutting edges spaced to avoid cutting through the wire. Such gripping by the cutting edges of the nipper jaws usually results in a notch in the wire and often causes failure or damage to the wire requiring repair or replacement. In the present invention, a notch in the side of one of the jaws is disposed to provide a wire guideway and passageway to permit inserting the wire between the shelf portions of the jaws without the wire being brought in the way of the shear cutting portions of the jaws. The gripping of the wire between parallel flat surfaces of the shelf portions permits the wire to be tightly gripped without locally notching the wire. A greater grip by this means can be exerted on the wire without damage to the wire.

It is an object of this invention to provide a plier-type wire cutter in which the cutting jaws are provided with shear-type cutting members and with the jaws having facing shell portions spaced so that as the wire is cut an end of the wire is gripped between the shelf portions until the jaws are opened.

It is a further object of this invention to provide a plier-type wire cutter in which one of the cutting jaws is provided with a wire bypass guideway or notch within which the wire may be fed to and between facing shelf portions for gripping of the wire therebetween and with the wire bypassing the cutting portions of the jaws.

INTENT OF THE DISCLOSURE

Although the following disclosure offered for public dissemination is detailed to insure adequacy and aid in understanding of the invention, this is not intended to prejudice that purpose of a patent which is to cover each new inventive concept therein no matter how it may later be disguised by variations in form or additions of further improvements. The claims at the end hereof are intended as the chief aid toward this purpose, as it is these that meet the requirement of pointing out the parts, improvements or combinations in which the inventive concepts are found.

There has been chosen two embodiments of a wire cutting tool for cutting wire such as is used in orthodontics and as adopted for use therewith. These embodiments show a preferred embodiment and a jaw modification or alternate thereof and have been chosen for the purpose of illustration and description as shown in the accompanying drawing wherein:

BRIEF DESCRIPTION OF THE DRAWING

FIG. 1 represents in a slightly less-than-life-size side view of a preferred embodiment of the wire cutting tool of this invention;

FIG. 2 is a bottom view looking upwardly at the forward or jaw portion of the tool of FIG. 1, the view being taken on the line 2—2 of FIG. 1;

FIG. 3 represents in an enlarged scale a side view of the jaw portions of the tool of FIG. 1 and in which is seen a wire being cut and showing the closed relationship of the jaws as the cut wire end is gripped between the platform portions of the jaw;

FIG. 4 represents a plane view of the cutting face of the lower jaw of the tool, the view being taken on the line 4—4 of FIG. 3;

FIG. 5 represents a fragmentary front view of the lower jaw and showing a wire bypass notch, the view being taken on the line 5—5 of FIG. 4;

FIG. 6 represents a fragmentary side view of an alternate embodiment of a wire cutting tool in which the jaws are disposed to provide a cutting edge aligned with the handles;

FIG. 7 represents a top view looying downwardly on the embodiment of FIG. 6, the view taken on the line 7—7 of FIG. 6, and FIGS. 8, 9 and 10 represent enlarged sectional views of the jaws in sequential action on a wire and showing the progressive operations of positioning, cutting and finally gripping the just cut wire.

In the following description and in the claims various details will be identified by specific names for convenience, these names, however, are intended to be generic in their application. Corresponding reference characters refer to like members throughout the several figures of the drawings.

The drawing accompanying, and forming part of, this specification discloses certain details of construction for the purpose of explanation of the broader aspects of the invention, but it should be understood that structural details may be modified in various respects without departure from the concept and principles of the invention and that the invention may be incorporated in other structural forms than shown.

DESCRIPTION OF THE PREFERRED EMBODIMENT

Referring now in particular to FIGS. 1 through 5, there is shown a wire cutting tool which comprises plier members 10 and 12. These members are shaped and disposed so as to be pivotally retained by a pin 14. The handle portions of the members 10 and 12 are conventionally curved for easy grasping in the palm of the user's hand; however, this construction is strictly a matter of preference in design and size selection. The portions extending leftwardly of the pivot 14 as seen in FIGS. 1 and 3 form short extending jaws 16 and 18, which jaws are terminated in portions turned substantially at a sixty to seventy degree angle to the general plane of the members 10 and 12. These extending terminating portions are identified as 20 and 22 and in the preferred embodiment are made of or have work surfaces of hardened tool steel.

The jaws 20 and 22 are shaped and disposed to provide mating shear cut edges 24 and 26. These edges, as the tool is brought into the closed position, are disposed to engage and cut a wire 30. In practice this wire may be approximately twenty thousandths of an inch in cross-section and either round or rectangular. The wire is usually of stainless steel or "Australian" wire, both of which are used in the practice of orthodontics. The mating edges 24 and 26 which form the shear cutting edges are of determined length and are at right angles to adjacent extending shelf portions 32 and 34. These shelf portions with the jaws in a closed condition are disposed a determined distance apart. There is formed in the lower jaw 18 a notch 40 which is preferably used as a retaining guide for a wire 30. The wire prior to cutting is laid in the notch 40 of the lower jaw, and a like mating notch may also be provided in the upper jaw to act as a further retaining means for holding the wire 30 in a selected position as the jaw members 16 and 18 are brought together.

In certain applications of the wire to the tooth attaching clips and the like, it is desirable or necessary to grip the wire by a tool and pull and/or push the wire into a determined position. To provide a gripping means with a great mechanical advantage to apply a powerful grip without notching or nicking the wire, there is provided in jaw 18 a bypass notch 42. This notch as seen particularly in FIGS. 3, 4 and 5 is shaped so that one side thereof lies in the plane of shelf portion 32. The notch is of sufficient size and depth so as to allow the maximum size wire contemplated for the tool to be brought into and retained therein. As reduced to practice, a wire cutter for wire having a maximum cross-sectional dimension of about twenty to thirty thousandths of an inch may have a notch 42 which is forty-thousandths of an inch wide and about fifty-thousandths of an inch deep.

USE AND OPERATION

In the use of the above-described wire-cutting tool the orthodontist prepares the wire in the usual manner; inserts the wire length into the patient's mouth; installs the wire and makes any necessary adjustments. The surplus wire portions which must be trimmed from the retaining assembly are then cut from the prepared wire and removed by the use of the exemplified tool. The wire 30 is brought in the way of the notch 40 and that portion of wire to be trimmed is brought in alignment with the shear faces 24 and 26. The handle portions of the members 10 and 12 are then urged toward each other to cause the jaws 16 and 18 to come together.

As edges 24 and 26 pass each other the wire is sheared at the plane of faces 24 and 26. The extending portion of wire which is trimmed or cut from the main length of wire 30 is now gripped between the shelf portions 32 and 34. At the moment of the severing of the wire, the shelf portions are spaced apart at about the distance of the maximum diameter contemplated of wire to be cut. The severing of the wire allows the jaws 16 and 18 to move rapidly the few thousandths of an inch toward each other, needed to grip the wire end. With the gripped scrap wire end retained between the outer shelf portions the cutting tool is removed from the mouth, after which the scrap portion of wire is discarded from the tool. The trimming of the other wire end is performed in a like manner as above-described. It is to be noted that a shear cut of the wire by the exemplified tool does not result in a displacing action at the moment of severing of the wire. In contradistinction to this result, the cutting of a wire by a pair of nippers wherein the jaws are brought together to sever the wire causes the wire to be displaced forwardly and backwardly during and at the completion of the cut. As seen in enlarged detail in FIGS. 8, 9 and 10 the wire 30 in FIG. 8 is brought in way of shelf 46 and shelf 34 with the jaws positioned so that the cut of the wire will occur at the plane of faces 24 and 26. Handles 10 and 12 are gripped to cause jaws 16 and 18 to be urged toward each other whereupon the tempered wire 30 is partially cut and then fractures as at FIG. 9 with the severing of the wire occurring before the cutting edges pass each other. The fracturing of the wire causes the free end to fly but before the free end of wire 30 can escape the shelves 32 and 34 approach each other to grip the wire and retain the loose end of the wire as shown in FIG. 10.

In the use of the plier-type tool as a means for gripping the wire for movement and manipulation, it is to be noted that the tool handles are grasped in the conventional manner. The wire 30 is placed in bypass notch 42 with a portion of the wire laying on shelf portion 32. The handles are urged toward each other to bring shelf portion 34 into engagement with the wire. The greater the force exerted on the handles the greater the grip on the wire between the shelf portions 32 and 34. As the wire is gripped by the two flat surfaces, the force applied to the wire is spread over a relatively long distance so that the wire may be grasped without deforming the wire.

DESCRIPTION OF THE ALTERNATE
EMBODIMENT OF FIGS. 6 AND 7

Referring finally to FIGS. 6 and 7, it is to be noted that jaw ends 50 and 51 instead of being offset at an angle as in FIGS. 1, 2 and 4 are aligned with the handles so as to cut the wire between a pair of straight extending jaws. The wire cutting tool of this embodiment includes a pair of jaws 50 and 51 which are provided with mating shear-cut edges 52 and 53. Matching notches 54 and 55 for retaining or guiding the wire may be formed in the jaw faces. Upper and lower shelf portions 57 and 58 are spaced a determined distance apart in the manner of FIG. 1 above. In the manner of the tool of FIG. 1 the trimmed end of the wire is gripped between these two shelf portion surfaces after and as the wire is cut by the passing edges 52 and 53.

It is to be noted that the wire-cutting tools above exemplified have their shelf portions 32 and 34 or 57 and 58 a calculated distance apart. In other words, the tool has a maximum limit to the size of wire it will effectively cut and grip. If the wire is of a larger diameter than the determined maximum diameter, the shear cut is not able to be completed as the cutting edges are not permitted to pass each other. This condition is undesirable. Although the shelf portions may meet as a minimum distance without a wire therebetween the distance from the cutting edge to the shelf is determined by the anticipated wire range. The time period between cutting a wire and the gripping of the loose piece is calculated to be nearly simultaneous. For example, if the cross-section of the wire being cut is twenty thousandths of an inch, it is contemplated that the wire will be gripped in another ten thousandths of an inch of movement. Such limitations are desirable to insure effective and positive operation of the tool.

In practice, the tools are made so that the shear edges are a determined distance from the shelf portions. The notches are a determined size and the tool is given a capacity size number or identification. Although the angle of the jaws have been shown as disposed in only two degrees of orientation to the handles, it is, of course recognized that any desired angle may be provided. To make "right" or "left" hand wire cuts it is only necessary that the user turn the tool over to bring the shear edges into the desired relationship to the wire being cut.

The tool shown and described is intended to provide a shear cut for a wire of a determined maximum diameter and to grip the scrap end of the wire as it is cut. Wherever such requirements are present the use of the above described wire-cutting tool is desirable and proper.

Terms such as "left," "right," "up," "down," "bottom," "top," "front," "back," "in," "out," and the like are applicable to the embodiments shown and described in conjunction with the drawing. These terms, as used, are merely for the purposes of description and do not necessarily apply to the position in which the wire-cutting tool may be constructed or used.

The conception of the wire-cutting tool with shear cutting edges and having end scrap gripping portions and the many applications of such a tool is not limited to the specific embodiments shown, but departures therefrom may be made within the scope of the accompanying claims and without sacrificing its chief advantages and protection is sought to the broadest extent the prior art allows.

What is claimed is:

1. A plier-type wire cutting tool particularly for use in orthodontics and the like, and in which the cutting of the wire is by means of a shear action, and as the wire is cut one of the severed wire portions is gripped between opposed flat shelf portions immediately after the wire is severed, said cutting tool comprising: (a) a pair of plier members each formed with connected jaw and handle portions; (b) means for retaining the plier members in a pivoted condition so that in response to the manipulation of the handle portions first and second jaw portions are moved toward and away from each other; (c) a shear-cutting edge formed in the jaw portion of each plier member, the edges formed and disposed to approach and slide by each other to shear a wire positioned in way of the cutting edges, and (d) a flat shelf portion formed in each jaw as an integral portion of the jaw, said shelf portions arranged as an opposed pair positioned in parallel facing spaced relationship so as to be not more than fifteen thousandths of an inch from gripping the cut wire portion as the cutting edges are caused to move past each other to sever the length of wire, said shelf on a first jaw terminating at a shear cutting edge, said opposed shelf on the second jaw extending to an inner face of an upwardly extending offset portion which terminates at the cutting edge provided on this jaw and with a second shelf portion formed on this second jaw and extending from the cutting edge of this second jaw, said second shelf being parallel to the first shelf and disposed to support that portion of the wire which after cutting is ungripped, said opposed gripping shelf portions and offset shelf portion as they support the wire as it is cut and gripped support and grip the wire absent the deforming of the wire portions.

2. A plier-type cutting tool as in claim 1 in which a notch is formed in at least one jaw portion, the notch shaped and positioned to receive and retain a wire in way of the cutting edges as said cutting edges are moved to and past each other to sever the wire.

3. A plier-type cutting tool as in claim 1 in which the shear cutting edges are disposed at about sixty degrees from the plane of the handle portions of the plier.

4. A plier-type cutting tool as in claim 1 in which the shear cutting edges are disposed in a plane parallel to the plane of the handles of the cutting tool.

5. A plier-type cutting tool as in claim 1 in which the positioning of the shelf portions is such that with the cutting-edges just severing the wire, the shelf portions are spaced apart at least as much as the largest diameter wire contemplated for the tool.

References Cited

UNITED STATES PATENTS

| 119,485 | 10/1871 | Gustavus | 30—135 |
|---|---|---|---|
| 214,943 | 4/1879 | Miller | 30—135 |
| 2,903,790 | 9/1959 | Klein | 30—134 |
| 3,058,213 | 10/1962 | Sandsto | 30—134 |
| 2,064,105 | 12/1936 | Conlee | 30—134 |
| 2,320,460 | 6/1943 | Muller | 30—134 |
| 3,287,751 | 11/1966 | Hoffman | 7—5.4 |

ROBERT C. RIORDON, Primary Examiner

J. C. PETERS, Assistant Examiner